United States Patent
Sekiya

(10) Patent No.: US 12,134,138 B2
(45) Date of Patent: Nov. 5, 2024

(54) WAFER MANUFACTURING METHOD

(71) Applicant: DISCO CORPORATION, Tokyo (JP)

(72) Inventor: Kazuma Sekiya, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 91 days.

(21) Appl. No.: 18/156,581

(22) Filed: Jan. 19, 2023

(65) Prior Publication Data
US 2023/0249282 A1   Aug. 10, 2023

(30) Foreign Application Priority Data

Feb. 9, 2022  (JP) .................................. 2022-018893

(51) Int. Cl.
*B23K 26/062*  (2014.01)
*B23K 26/00*  (2014.01)
*B26D 3/28*  (2006.01)
*B26D 7/08*  (2006.01)
*B23K 103/00*  (2006.01)

(52) U.S. Cl.
CPC ........ *B23K 26/0093* (2013.01); *B23K 26/062* (2015.10); *B26D 3/282* (2013.01); *B26D 7/086* (2013.01); *B23K 2103/56* (2018.08)

(58) Field of Classification Search
CPC .. B23K 26/0093; B23K 26/062; B23K 26/53; B23K 2103/56; B26D 3/282; B26D 7/086
See application file for complete search history.

(56) References Cited

U.S. PATENT DOCUMENTS

2021/0316476 A1\* 10/2021 Nomaru ............... B28D 5/0011

FOREIGN PATENT DOCUMENTS

| JP | 2000094221 A | 4/2000 |
|----|--------------|--------|
| JP | 2013049161 A | 3/2013 |

\* cited by examiner

*Primary Examiner* — Christopher J. Besler
(74) *Attorney, Agent, or Firm* — Greer, Burns & Crain, Ltd.

(57) ABSTRACT

A wafer manufacturing method includes: a crack layer forming step of applying a laser beam of such a wavelength as to be transmitted through an ingot to the ingot, with a focal point of the laser beam positioned in a region spaced from an end face of the ingot by a distance corresponding to the thickness of the wafer to be manufactured, to form a crack layer, a cut groove forming step of positioning a cutting blade on an extension line of the crack layer and forming a cut groove continuous with the crack layer in a periphery of the ingot; and a peeling step of applying an ultrasonic wave to the end face of the ingot to peel off the wafer to be manufactured, along the crack layer.

4 Claims, 5 Drawing Sheets

WAFER MANUFACTURING METHOD

BACKGROUND OF THE INVENTION

Field of the Invention

The present invention relates to a wafer manufacturing method for manufacturing a wafer from an ingot.

Description of the Related Art

Such devices as integrated circuits (ICs), large scale integration (LSI) circuits, and light emitting diodes (LEDs) are formed by a functional layer being laminated on a front surface of a wafer whose blank material is silicon (Si) or sapphire ($Al_2O_3$), for example, and the devices being partitioned in the functional layer by a plurality of intersecting streets. In addition, power devices, LEDs, and the like are formed by a functional layer being laminated on a front surface of a wafer whose blank material is hexagonal single crystal of silicon carbide (SiC), gallium nitride (GaN), or the like and the power devices, LEDs, and the like being partitioned in the functional layer by a plurality of intersecting streets.

The wafer formed with the devices is processed along the streets by a cutting apparatus or a laser processing apparatus to be divided into individual device chips, and each of the thus divided device chips is used for electronic apparatuses such as mobile phones and personal computers.

The wafer to be formed with the devices is typically manufactured by slicing a cylindrical ingot by a wire saw. The front surface and the back surface of the manufactured wafer are finished to a mirror surface by polishing (refer to, for example, Japanese Patent Laid-open No. 2000-94221).

However, when the ingot is cut by the wire saw and the front surface and the back surface of the cut wafer are polished, most (70% to 80%) of the ingot is discarded, which is uneconomical. Particularly, in the case of the hexagonal single crystal ingot of SiC, GaN, or the like, the material has high hardness, is difficult to cut by the wire saw, and takes considerable time to cut, leading to poor productivity, and the ingot, which is high in unit cost, has a problem in manufacturing a wafer efficiently.

In view of the foregoing, there has been proposed a technology in which a laser beam of such a wavelength as to be transmitted through the ingot is applied to the ingot, with the focal point of the laser beam positioned inside the ingot, to form a crack layer on a scheduled cutting plane, and a wafer is peeled off from the ingot along the scheduled cutting plane where the crack layer is formed (refer to, for example, Japanese Patent Laid-open No. 2013-49161).

SUMMARY OF THE INVENTION

However, at the periphery of the ingot on the extension line of the crack layer, the laser beam would be refracted, irregularly reflected, or kicked, and the crack layer may be formed in an immature form. In such a case, at the time of peeling off a wafer from the ingot, the peeling would be hampered by the immature crack layer, and the wafer may be damaged.

Accordingly, it is an object of the present invention to provide a wafer manufacturing method free of the risk that the peeling-off of the wafer is hampered by an immature crack layer, at the time of peeling off the wafer from the ingot along a crack layer.

In accordance with an aspect of the present invention, there is provided a wafer manufacturing method for manufacturing a wafer from an ingot, including a crack layer forming step of applying a laser beam of such a wavelength as to be transmitted through the ingot to the ingot, with a focal point of the laser beam positioned in a region spaced from an end face of the ingot by a distance corresponding to a thickness of the wafer to be manufactured, to form a crack layer, a cut groove forming step of positioning a cutting blade on an extension line of the crack layer and forming, in a periphery of the ingot, a cut groove continuous with the crack layer, and a peeling step of applying an ultrasonic wave to the end face of the ingot to peel off the wafer to be manufactured, along the crack layer, after the cut groove forming step.

Preferably, the ingot is a SiC ingot having a first surface constituting the end face, a second surface on a side opposite to the first surface, a c-axis extending from the first surface to the second surface, and a c-plane orthogonal to the c-axis, in the crack layer forming step, a focal point of a laser beam of such a wavelength as to be transmitted through SiC and the ingot are moved relative to each other in a direction orthogonal to a direction in which an off angle is formed, to form a rectilinear crack layer, and the crack layer forming step includes an indexing step of moving the focal point and the ingot relative to each other in the direction in which the off angle is formed, to perform index feeding by a predetermined amount.

According to the wafer manufacturing method of the present invention, the immature crack layer located at the periphery of the ingot is removed when the cut groove is formed. Hence, at the time of peeling off the wafer from the ingot along the crack layer, the peeling would not be hampered by the immature crack layer, and the wafer can efficiently be manufactured from the ingot.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

A preferred embodiment of a wafer manufacturing method of the present invention will be described in detail below with reference to the drawings.

Figure 1:
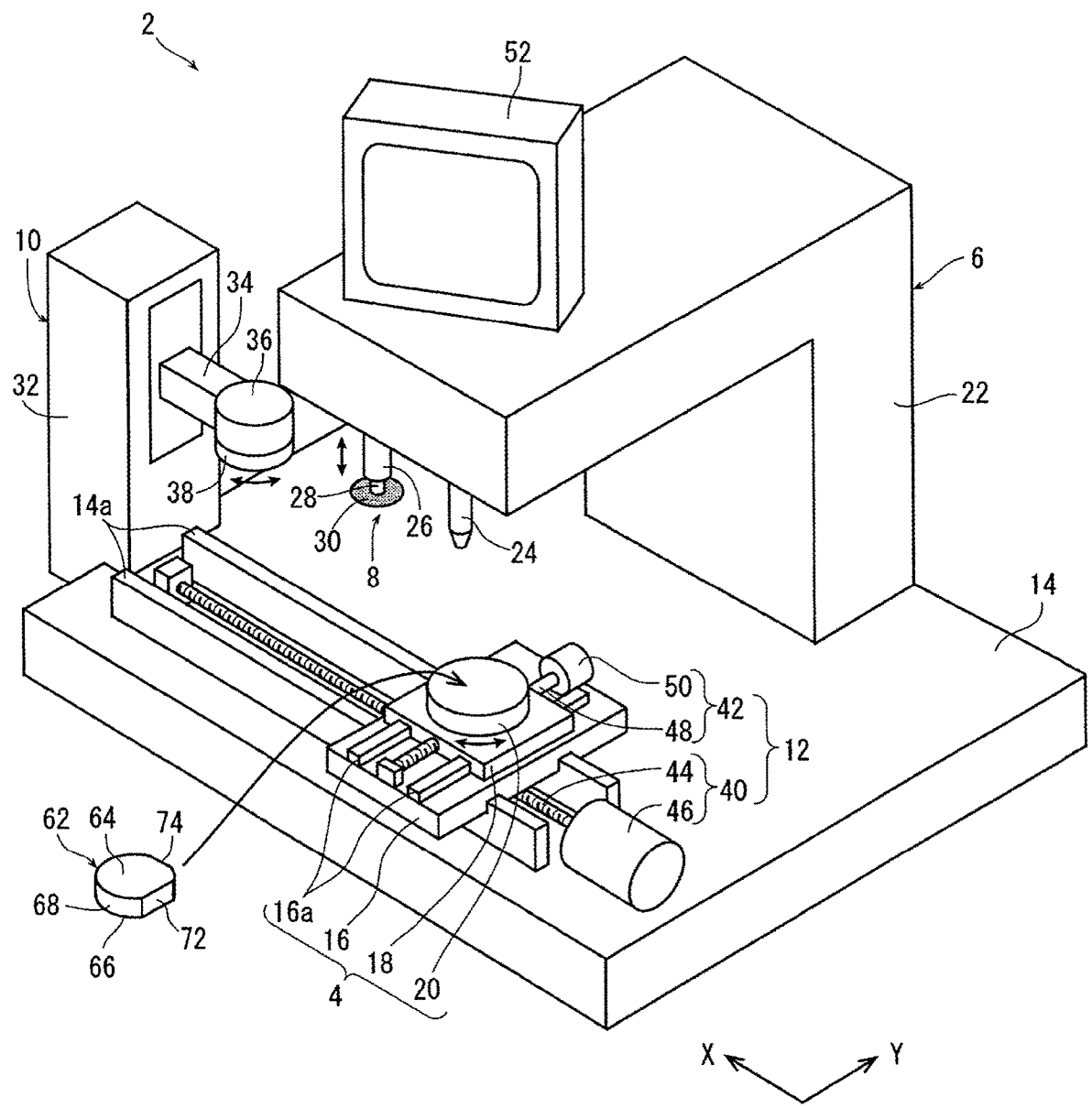
FIG. 1 is a perspective view depicting a wafer manufacturing apparatus capable of carrying out a wafer manufacturing method of the present invention.

FIG. 1 illustrates an example of a wafer manufacturing apparatus capable of carrying out the wafer manufacturing method of the present invention. The wafer manufacturing apparatus 2 includes a holding unit 4 that holds an ingot, a crack layer forming unit 6 that applies a laser beam of such a wavelength as to be transmitted through the ingot to the ingot, with a focal point of the laser beam positioned in a region spaced from an end face of the ingot by a distance corresponding to the thickness of the wafer to be manufactured, to form a crack layer, a cut groove forming unit 8 that positions a cutting blade on an extension line of the crack layer and forms, in a periphery of the ingot, a cut groove continuous with the crack layer, a peeling unit 10 that applies an ultrasonic wave to the end face of the ingot to peel off the wafer to be manufactured, along the crack layer, and a moving mechanism 12 that moves the holding unit 4.

The holding unit 4 includes an X-axis movable plate 16 supported on a base 14 movably in an X-axis direction, a Y-axis movable plate 18 supported by the X-axis movable plate 16 movably in a Y-axis direction; a holding table 20 rotatably supported on an upper surface of the Y-axis movable plate 18, and a motor (not illustrated) that rotates the holding table 20.

Note that the X-axis direction is a direction indicated by an arrow X in FIG. 1, the Y-axis direction is a direction indicated by an arrow Y in FIG. 1 and orthogonal to the X-axis direction, and an XY plane defined by the X-axis direction and the Y-axis direction is substantially horizontal.

In the holding unit 4, the ingot is held by an upper surface of the holding table 20 through an appropriate adhesive (for example, an epoxy resin-based adhesive). Alternatively, the upper surface of the holding table 20 may be formed with a plurality of suction holes, and a suction force may be produced at the upper surface of the holding table 20 to hold under suction the ingot.

The crack layer forming unit 6 includes a housing 22 extending upward from an upper surface of the base 14 and then extending substantially horizontally, a laser oscillator (not illustrated) incorporated in the housing 22, and a light concentrating unit 24 disposed on a lower surface of a tip of the housing 22.

The laser oscillator emits a pulsed laser beam of such a wavelength as to be transmitted through the ingot which is a workpiece (for example, 1,064 nm in the case of the SiC ingot). The light concentrating unit 24 concentrates the laser beam emitted by the laser oscillator, to apply the laser beam to the ingot.

The cut groove forming unit 8 includes a spindle housing 26 mounted to the lower surface of the tip of the housing 22 in a liftable and lowerable manner, a lifting and lowering mechanism (not illustrated) that lifts and lowers the spindle housing 26, a spindle 28 rotatably supported by the spindle housing 26, and an annular cutting blade 30 mounted to the spindle 28.

The lifting and lowering mechanism may be configured to have a ball screw coupled to the spindle housing 26 and extending in the vertical direction and a motor for rotating the ball screw. The spindle 28 extends in the vertical direction, and is rotated about an axis extending in the vertical direction by a spindle motor (not illustrated) incorporated in the housing 22. In addition, the cutting blade 30 fixed to a lower end of the spindle 28 is disposed along the XY plane, and is rotated together with the spindle 28 about an axis extending in the vertical direction.

The peeling unit 10 includes a casing 32 extending upward from end parts of guide rails 14a on the base 14 and an arm 34 supported by the casing 32 in a liftable and lowerable manner and extending in the X-axis direction. A lifting and lowering mechanism (not illustrated) for lifting and lowering the arm 34 is incorporated in the casing 32.

A motor 36 is additionally disposed at a tip of the arm 34, and a suction piece 38 is coupled to a lower surface of the motor 36 rotatably about an axis extending in the vertical direction. The suction piece 38 is connected to suction means (not illustrated), and a lower surface of the suction piece 38 is formed with a plurality of suction holes (not illustrated). In addition, ultrasonic vibration imparting means (not illustrated) for imparting ultrasonic vibration to the lower surface of the suction piece 38 is incorporated in the suction piece 38.

The moving mechanism 12 includes an X-axis feeding mechanism 40 that moves the holding unit 4 in the X-axis direction relative to the crack layer forming unit 6 and the cut groove forming unit 8 and a Y-axis feeding mechanism 42 that moves the holding unit 4 in the Y-axis direction relative to the crack layer forming unit 6 and the cut groove forming unit 8.

The X-axis feeding mechanism 40 has a ball screw 44 coupled to the X-axis movable plate 16 and extending in the X-axis direction and a motor 46 for rotating the ball screw 44. The X-axis feeding mechanism 40 converts a rotational motion of the motor 46 into a rectilinear motion and transmits it to the X-axis movable plate 16 by the ball screw 44, and moves the X-axis movable plate 16 in the X-axis direction along the guide rails 14a on the base 14.

The Y-axis feeding mechanism 42 has a ball screw 48 coupled to the Y-axis movable plate 18 and extending in the Y-axis direction and a motor 50 for rotating the ball screw 48. The Y-axis feeding mechanism 42 converts a rotational motion of the motor 50 into a rectilinear motion and transmits it to the Y-axis movable plate 18 by the ball screw 48, and moves the Y-axis movable plate 18 in the Y-axis direction along guide rails 16a on the X-axis movable plate 16.

Though not illustrated, an imaging unit for detecting the region where laser processing is to be conducted by the crack layer forming unit 6 is provided on the housing 22 of the wafer manufacturing apparatus 2. An image picked up by the imaging unit is displayed on a monitor 52 disposed on an upper surface of the housing 22.

Figure 2A:
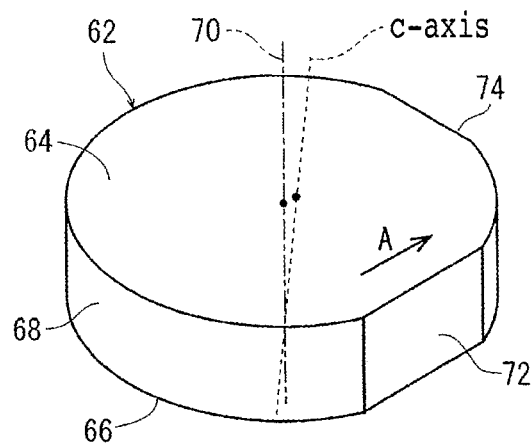
FIG. 2A is a perspective view of an ingot.
Figure 2B:
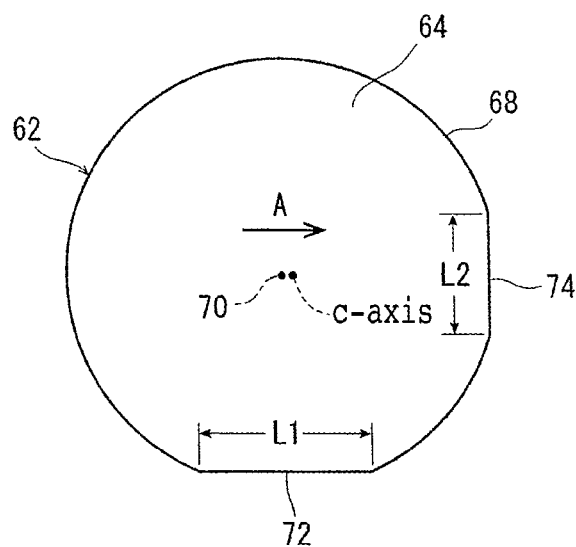
FIG. 2B is a plan view of the ingot depicted in FIG. 2A.
Figure 2C:
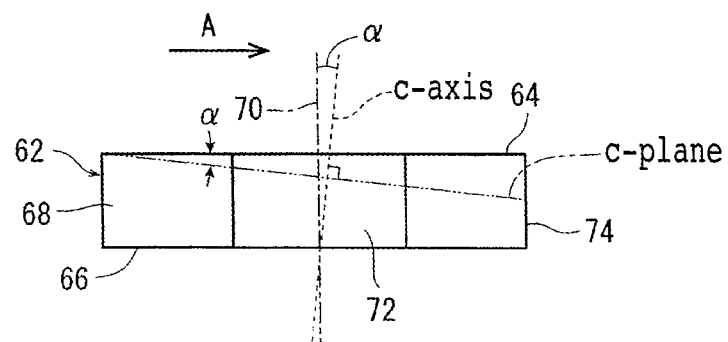
FIG. 2C is a front view of the ingot depicted in FIG. 2A.

FIGS. 2A to 2C illustrate a cylindrical ingot 62 to be processed by the wafer manufacturing method of the present invention. The ingot 62 illustrated is formed of a single crystal SiC.

The ingot 62 has a circular first surface 64, a circular second surface 66 on the side opposite to the first surface 64, a circumferential surface 68 located between the first surface 64 and the second surface 66, a c-axis extending from the first surface 64 to the second surface 66, and a c-plane (see FIG. 2C) orthogonal to the c-axis. At least the first surface 64 is planarized by grinding or polishing to such an extent as not to hinder the incidence of a laser beam LB.

In the ingot 62, the c-axis is inclined relative to a perpendicular 70 to the first surface 64, and an off angle α (for example, α=1, 3, or 6 degrees) is formed by the c-plane and the first surface 64. The direction in which the off angle α is formed is indicated by an arrow A in FIGS. 2A to 2C.

The circumferential surface 68 of the ingot 62 is formed with a rectangular first orientation flat 72 and a rectangular second orientation flat 74 both of which indicate a crystal orientation. The first orientation flat 72 is parallel to the direction A in which the off angle α is formed, whereas the second orientation flat 74 is orthogonal to the direction A in which the off angle α is formed. As depicted in FIG. 2B, as viewed from the upper side, the length L2 of the second orientation flat 74 is shorter than the length L1 of the first orientation flat 72 (L2<L1).

Note that the ingot to be processed by the wafer manufacturing method of the present invention is not limited to the above-described ingot 62, and may be a SiC ingot in which the c-axis is not inclined relative to the perpendicular to the first surface and the off angle α between the c-plane and the first surface is 0 degrees (in other words, the perpendicular to the first surface and the c-axis coincide with each other), or may be an ingot formed of a blank material other than SiC, such as Si or GaN.

Wafer Manufacturing Method

Next, a method of manufacturing a wafer from an ingot by use of the above-described wafer manufacturing apparatus 2 will be described.

Holding Step

In the present embodiment, first, a holding step of holding the ingot 62 by the holding unit 4 is performed. In the holding step, the ingot 62 is fixed on an upper surface of the holding table 20 through an appropriate adhesive (for example, an epoxy resin-based adhesive), with the first surface 64 directed upward. Note that the upper surface of the holding table 20 may be formed with a plurality of suction holes, and a suction force may be produced at the upper surface of the holding table 20 to hold under suction the ingot 62.

Crack Layer Forming Step

After the holding step is carried out, conducted is a crack layer forming step in which the laser beam LB of such a wavelength as to be transmitted through the ingot 62 is applied to the ingot 62, with a focal point of the laser beam LB positioned in a region spaced from an end face of the ingot 62 by a distance corresponding to the thickness of the wafer to be manufactured, to form a crack layer.

In the crack layer forming step, first, the X-axis feeding mechanism 40 is operated to position the holding table 20 directly under the imaging unit. Then, the ingot 62 is imaged by the imaging unit, and, in reference to the image of the ingot 62 picked up by the imaging unit, the direction of the ingot 62 is adjusted to a predetermined direction, and the positional relation between the ingot 62 and the light concentrating unit 24 is adjusted.

Figure 3A:
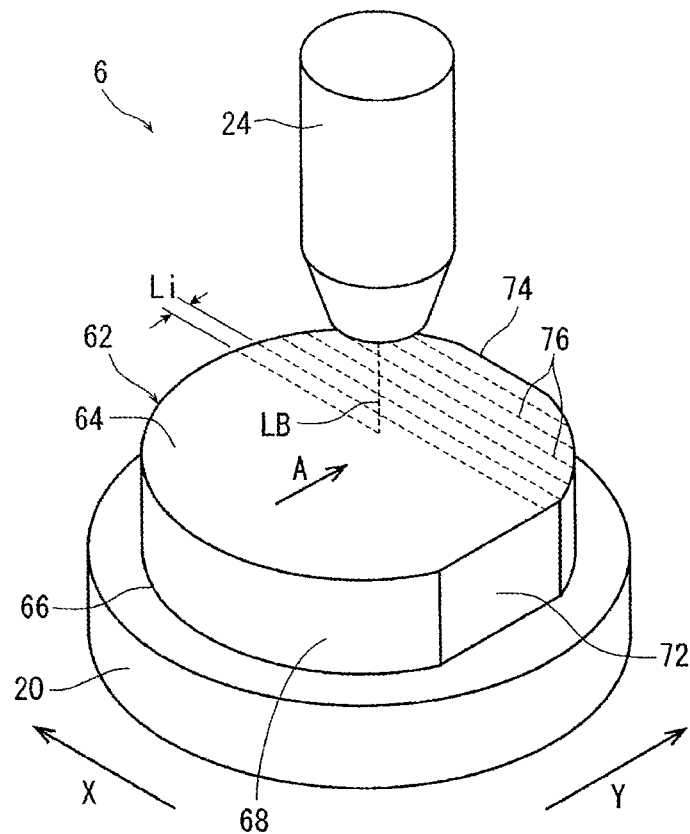
FIG. 3A is a perspective view depicting a crack layer forming step.

In adjusting the direction of the ingot 62 to the predetermined direction, the second orientation flat 74 is aligned with the X-axis direction, as depicted in FIG. 3A. As a result, the direction orthogonal to the direction A in which the off angle α is formed is aligned with the X-axis direction, and the direction A in which the off angle α is formed is aligned with the Y-axis direction.

Figure 3B:
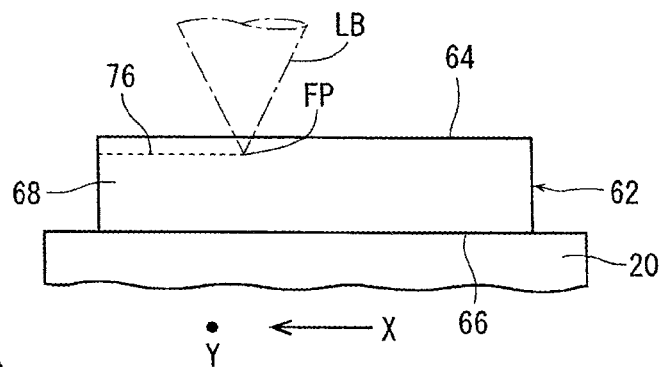
FIG. 3B is a front view depicting the crack layer forming step.
Figure 3C:
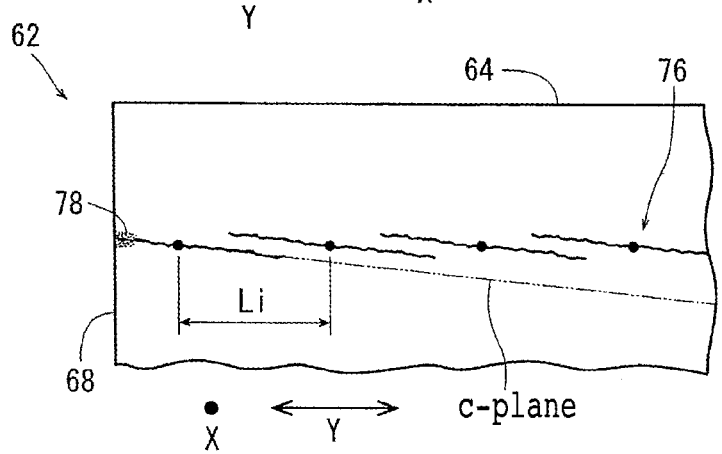
FIG. 3C is a sectional view of the ingot formed with a crack layer.

Next, the focal point FP (see FIG. 3B) of the pulsed laser beam LB of such a wavelength as to be transmitted through SiC is positioned to a depth corresponding to the thickness of the wafer to be manufactured, from the end face (first surface 64) of the ingot 62. Subsequently, the focal point FP and the ingot 62 are moved relative to each other in the X-axis direction at a predetermined speed. As a result, as depicted in FIG. 3C, a rectilinear crack layer 76 in which SiC is separated into Si and carbon (C) can be formed along the X-axis direction (crack layer forming step). The crack layer 76 spreads along the c-plane.

Next, the focal point FP and the ingot 62 are moved relative to each other in the Y-axis direction to perform index feeding (indexing step) by a predetermined amount. An index amount Li is a length not exceeding the width of the crack layer 76, such that the crack layer 76 and the crack layer 76 adjacent to each other in the Y-axis direction overlap with each other as viewed vertically. Further, the crack layer forming step and the indexing step are alternately repeated, whereby a plurality of crack layers 76 are formed at a depth (scheduled cutting plane) corresponding to the thickness of the wafer to be manufactured.

Note that at the periphery of the ingot 62 on the extension line of the crack layer 76, the focal point FP of the laser beam LB would be refracted, irregularly reflected, or kicked, so that the crack layer 76 may be formed in an immature form. In FIG. 3C, the immature crack layer formed at the periphery of the ingot 62 is indicated by a reference sign 78.

The crack layer forming step can be carried out, for example, under the following processing conditions.

Wavelength of pulsed laser beam: 1,064 nm
Pulse width: 3 ns
Repetition frequency: 120 kHz
Feeding speed: 750 mm/s
Distance from first surface to focal point: 700 μm

Cut Groove Forming Step

After the crack layer forming step is carried out, conducted is a cut groove forming step in which the cutting blade 30 is positioned on the extension line of the crack layer 76 and a cut groove continuous with the crack layer 76 is formed at the periphery of the ingot 62.

In the cut groove forming step, first, the holding table 20 is moved to the lower side of the cut groove forming unit 8, and the positional relation between cutting blade 30 of the cut groove forming unit 8 and the ingot 62 is adjusted. In this instance, the height of the cutting blade 30 is aligned with the height of the crack layer 76 of the ingot 62, and the cutting blade 30 is positioned on the extension line of the crack layer 76.

Figure 4A:
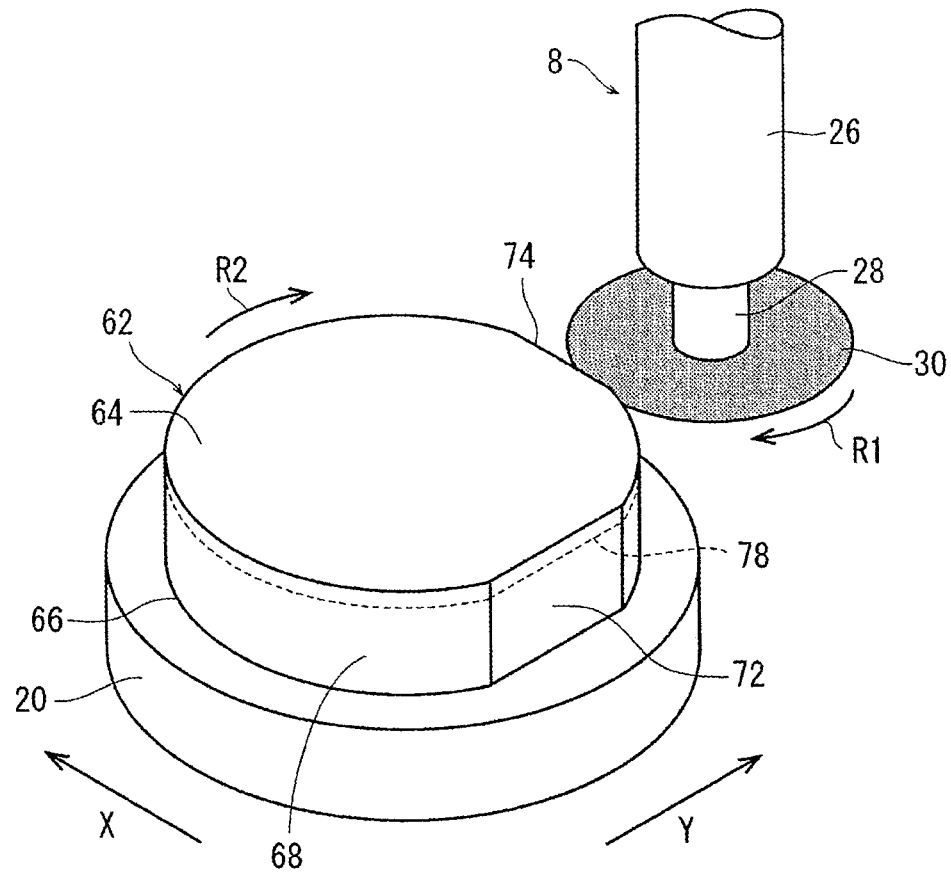
FIG. 4A is a perspective view depicting a cut groove forming step.
Figure 4B:
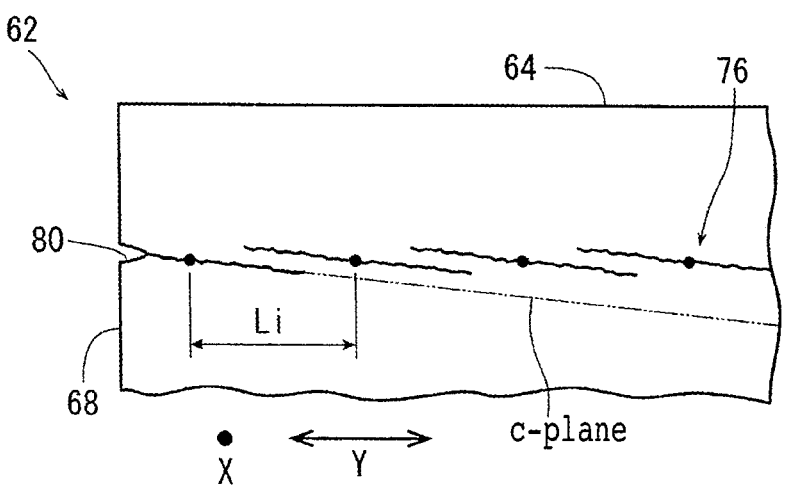
FIG. 4B is a sectional view of the ingot formed with a cut groove.

Next, as depicted in FIG. 4A, the cutting blade 30 is rotated in the direction indicated by an arrow R1. In addition, the holding table 20 is rotated in the direction indicated by an arrow R2. Subsequently, the holding table 20 is moved toward the cutting blade 30, the cutting edge of the cutting blade 30 is made to cut into the periphery of the ingot 62 to reach a predetermined depth, and cutting water is supplied to the part where the cutting edge of the cutting blade 30 is made to cut in. As a result, as depicted in FIG. 4B, the immature crack layer 78 can be removed, and a cut groove 80 continuous with the crack layer 76 can be formed in the periphery of the ingot 62.

As described above, the ingot 62 of the present embodiment is formed with the first and second orientation flats 72 and 74. Hence, when the cutting blade 30 comes around the first and second orientation flats 72 and 74, the holding table 20 is appropriately moved in the X-axis direction and the Y-axis direction, to form the cut groove 80 along the first and second orientation flats 72 and 74. In this way, the cut groove 80 of a predetermined depth continuous with the crack layer 76 is formed over the whole circumference of the ingot 62.

The cut groove forming step can be carried out, for example, under the following processing conditions.

Cutting blade: nickel electroformed blade
Thickness of cutting blade: 60 μm
Diameter of cutting blade: 52 mm Rotational speed of cutting blade: 3,600 rpm
Cutting-in depth: 200 μm
Feeding speed: 1 mm/s Peeling Step After the cut groove forming step is carried out, conducted is a peeling step in which an ultrasonic wave is applied to the end face of the ingot 62 to peel off the wafer to be manufactured, along the crack layer 76.

Figure 5:
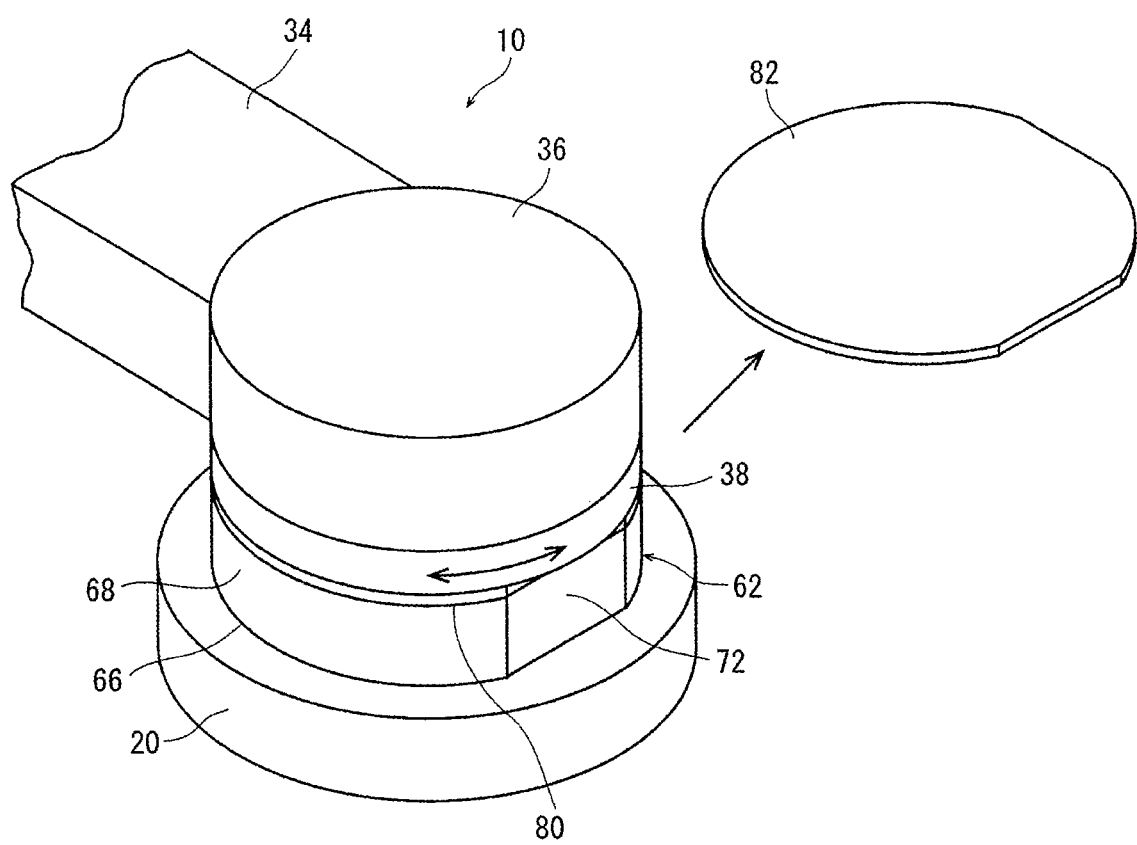
FIG. 5 is a schematic diagram depicting a peeling step.

In the peeling step, first, the X-axis feeding mechanism 40 is operated to position the holding table 20 on the lower side of the suction piece 38 of the peeling unit 10. Next, as depicted in FIG. 5, the arm 34 is lowered to bring the lower surface of the suction piece 38 into close contact with the upper surface (first surface 64) of the ingot 62. Subsequently, the suction means is operated to cause the lower surface of the suction piece 38 to be sucked onto the upper surface of the ingot 62.

Then, the ultrasonic wave applying means is operated to apply an ultrasonic wave to the upper surface of the ingot 62. As a result, a wafer 82 can be peeled off from the ingot 62 along the crack layer 76 formed at the depth corresponding to the thickness of the wafer to be manufactured. At the time of applying the ultrasonic wave, the suction piece 38 may be rotated by the motor 36 to apply a torsional stress to the ingot 62. Note that, after the wafer 82 is peeled off, the peeling surface of the ingot 62 and the peeling surface of the wafer 82 are planarized by grinding or polishing.

As has been described above, in the cut groove forming step of the present embodiment, the immature crack layer 78 located at the periphery of the ingot 62 is removed, so that at the time of peeling off the wafer 82 along the crack layer 76, the peeling would not be hampered by the immature crack layer 78. Therefore, the wafer 82 can efficiently be manufactured from the ingot 62 with no damage caused to the wafer 82.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A wafer manufacturing method for manufacturing a wafer from an ingot, comprising:
    a crack layer forming step of applying a laser beam of such a wavelength as to be transmitted through the ingot to the ingot, with a focal point of the laser beam positioned in a region spaced from an end face of the ingot by a distance corresponding to a thickness of the wafer to be manufactured, to form a crack layer;
    a cut groove forming step of positioning a cutting blade on an extension line of the crack layer and forming, in a periphery of the ingot, a cut groove continuous with the crack layer; and
    a peeling step of applying an ultrasonic wave to the end face of the ingot to peel off the wafer to be manufactured, along the crack layer, after the cut groove forming step.

2. The wafer manufacturing method according to claim 1, wherein the ingot is a silicon carbide ingot having a first surface constituting the end face, a second surface on a side opposite to the first surface, a c-axis extending from the first surface to the second surface, and a c-plane orthogonal to the c-axis,
    wherein in the crack layer forming step, the focal point of a laser beam and the silicon carbide ingot are moved relative to each other in a direction orthogonal to a direction in which an off angle is formed, to form the crack layer, and
    the crack layer forming step includes an indexing step of moving the focal point and the silicon carbide ingot relative to each other in the direction in which the off angle is formed, to perform index feeding by a predetermined amount.

3. The wafer manufacturing method according to claim 1, wherein, in the crack layer forming step, the focal point of the laser beam and the ingot are moved relative to each other in a X-direction, which is orthogonal to a direction in which an off angle is formed, to form the crack layer.

4. The wafer manufacturing method according to claim 1, wherein, in the crack layer forming step, the focal point and the ingot are moved relative to each other in a Y-direction in which an off angle is formed, to perform index feeding by a predetermined amount.

* * * * *